Sept. 20, 1932.   C. S. HANSEN   1,877,859

VALVE

Filed Aug. 10, 1931

INVENTOR.
Charles S. Hansen.
BY
ATTORNEY.

Patented Sept. 20, 1932

1,877,859

UNITED STATES PATENT OFFICE

CHARLES S. HANSEN, OF SOUTH MILWAUKEE, WISCONSIN

VALVE

Application filed August 10, 1931. Serial No. 556,125.

This invention appertains to valves, and more particularly to valves of the type especially designed for controlling the flow of acids, although the valve is susceptible for use in the handling of all kinds of fluid and liquids.

One of the salient objects of my invention is to provide a control valve in which the operating parts thereof are completely separated from the passage of the fluid passing through the valve body, whereby the operating parts will be prevented from deteriorating under the action of the material flowing through the valve body, and whereby all of the operating parts can be successfully lubricated at all times.

Another important object of my invention is the provision of a valve embodying a single casing having a partition therein defining a longitudinal passage for the flow of material therethrough and a chamber for housing the various operating parts of the valve, the walls of the chamber slidably receiving the valve stem which extends into the passage for the material to permit the control of the material therethrough.

A further object of my invention is the provision of novel means for arranging the operating parts of the valve in the chamber, whereby the valve stem can be conveniently and easily actuated by the operator of the valve.

A further object of my invention is the provision of novel means for constructing the operating parts of the valve, whereby the manipulating handle for said parts can be arranged exteriorly of the valve casing and substantially parallel therewith, whereby the valve casing or body and manipulating handle can be conveniently grasped by one hand of the operator to facilitate the actuation of the valve and the manipulation of the valve body where the valve body is carried by a flexible hose.

A still further object of my invention is to provide a valve of the above character, which will be durable and efficient in use, one that will be simple and easy to manufacture, and one which can be placed upon the market at a reasonable cost.

Figure 1:
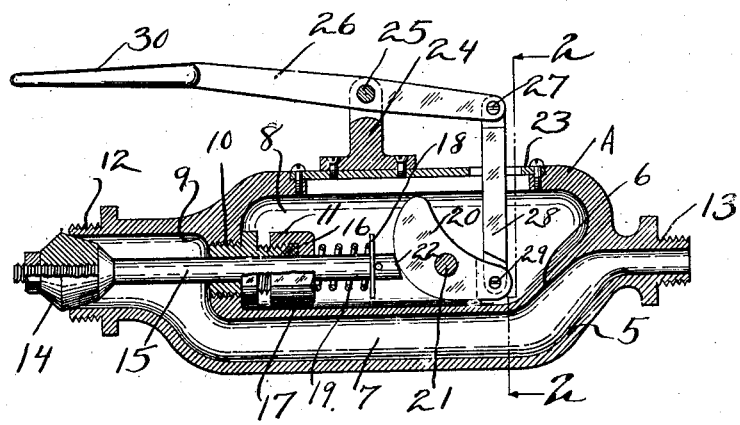
Figure 2:
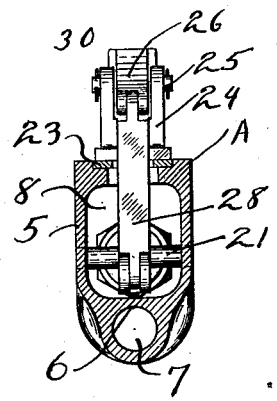

With these and other objects in view the invention consists in the novel construction, arrangement, and formation of parts as will be hereinafter more specfically described, claimed, and illustrated in the accompanying drawing, in which drawing Figure 1 is a longitudinal section through my improved valve;

Figure 2 is a transverse section through the valve taken on the line 2—2 of Figure 1, looking in the direction of the arrows.

Referring to the drawing in detail, wherein similar reference characters designate corresponding parts throughout the several views, the letter A generally indicates my improved valve, which comprises a casing 5 formed of any desired material and in any preferred shape. The casing 5 as shown extends longitudinally and is of hollow construction, and is provided with a longitudinally extending partition 6 defining a longitudinally extending fluid passageway 7 and a chamber 8. The passageway 7 and the chamber 8 extend longitudinally of the valve casing 5, and the passageway 7 lies on one side of casing, and the chamber 8 is disposed on the opposite side of the casing.

As clearly shown in Figure 1 of the drawing, the chamber 8 terminates short of one end of the casing and is closed by an end wall 9. This end wall 9 is provided with an internally threaded bore 10 for receiving the hollow guide plug 11 which extends into the chamber 8. The opposite ends of the casing 5 are provided respectively with inlet and outlet nipples 12 and 13, which communicate with and form a continuation of the fluid passageway 7. The nipple 12 has its outer end treated to provide a valve seat, and a valve head 14 of any desired character is provided for fitting upon said seat.

The valve head 14 is fitted on a valve stem 15 which slidably extends into the chamber 8 through the guide plug 11 provided for that purpose. The inner end of the guide plug 10 around the valve stem 15 carries packing 16 and packing nut 17 for preventing the leakage of material past the valve stem 15 into the chamber 8.

Arranged on the inner end of the valve stem 15 is a stop washer 18 against which bears the inner end of the expansion coil spring 19. This spring is placed about the valve stem and bears against the packing nut 16 and serves as means for normally holding the valve 14 on its seat.

The operating means for the valve stem embodies an operating cam 20 disposed in the chamber 8. This cam 20 is rockably mounted intermediate its ends on a suitable pivot pin 21 carried by the side walls of the valve casing. The curved operative face of the cam is arranged facing the inner end of the valve stem 15, and the valve stem is preferably bevelled, as at 22, for engaging against the curved face of the cam.

To facilitate replacement of parts and the proper lubrication of the operating parts, the valve casing is provided with a removable top plate 23, which top plate closes the chamber 8. A supporting bracket 24 is secured to the top plate and carries a pivot pin 25 on which is mounted the operating lever 26. The inner end of the lever has pivotally connected thereto, as at 27, a link 28, which extends through the cover plate 23 into the chamber 8. The inner end of the link 28 is pivotally connected as at 29 to the cam 20 at one side of the pivot point thereof.

From this construction it can be seen that when the lever 26 is moved toward the valve casing the cam 20 will be rocked, causing the curved surface thereof to bear against the bevelled inner end 22 of the valve stem. This will reciprocate the valve stem 15 against the tension of its spring 19, which will unseat the valve body 14, allowing the flow of fluid through the passageway 7.

From the foregoing description it can be seen that I have provided a novel valve in which the operating parts are kept separate at all times from the fluid flowing through the valve. This effectively prevents deterioration of the operating parts, and insures the proper operation of the valve at all times.

The outer end of the lever 26 can be provided with a manipulating handle 30, and it is to be noted that this handle overlies the body or casing 5. This permits the simultaneous gripping of the valve body 5 and the hand grip 30, so as to permit the manipulation of the lever 26, and the moving of the valve casing when necessary or desired.

If preferred, I can provide means for locking the lever 26 in fixed relation relative to the casing 5, so that the valve head 14 can be held off of its seat against the tension of the spring 19, when pressure is released from the hand grip.

Changes in details may be made without departing from the spirit or the scope of this invention, but what I claim as new is:

1. A valve comprising a longitudinally extending casing, a longitudinally extending partition disposed in the casing defining a fluid passageway and a chamber, a valve head for controlling the flow of fluid through the passageway, a valve stem for the valve head extending into the chamber, and operating means for the valve stem housed within said chamber.

2. A valve comprising a valve casing, a longitudinally extending partition in the casing defining a longitudinally extending fluid passageway and a longitudinally extending chamber, the passageway and chamber being separate from one another, inlet and outlet nipples carried by the casing communicating with the pasageway, one of said nipples being provided with a valve seat, a longitudinally extending valve stem slidably supported by the partition extending into the chamber, a valve head carried by the valve stem for the seat, spring means arranged within the chamber normally holding the valve body on its seat, a cam rockably mounted in the chamber engaging the inner end of the valve stem, an operating lever rockably mounted exteriorly of the casing, and a link pivotally connected to one end of the operating lever and to one end of the cam at one side of its pivot.

3. A valve comprising a hollow casing, a longitudinally extending partition in said casing defining a fluid passageway and a chamber, inlet and outlet nipples on said casing communicating with the pasageway, one of said nipples being provided with the valve seat, the chamber terminating short of the last mentioned nipple and having a bore in its wall in axial alignment with said nipple, a guide plug fitted in said bore, a valve stem slidably mounted in the guide plug, a valve head secured to the valve stem for the valve seat, the stem extending into the chamber and having a bevelled inner end, a packing and packing nut carried by the plug surrounding the valve stem, spring means arranged in the chamber normally urging the valve stem and the valve in one direction, a pivot pin in said chamber, a cam rockably mounted intermediate its ends on the pivot pin having its arcuate face engaging the bevelled end of the valve stem, a removable cover plate carried by the casing for said chamber, a bracket secured to the cover plate, an operating lever rockably mounted on the bracket, a link pivotally connected to one end of the lever and to one end of the cam at one side of the pivot point thereof, and a hand grip on the lever overlying the casing and in substantial parallel relation therewith.

In testimony that I claim the foregoing I have hereunto set my hand at Milwaukee, in the county of Milwaukee and State of Wisconsin.

CHARLES S. HANSEN.